United States Patent [19]
Evans

[11] Patent Number: 6,107,380
[45] Date of Patent: Aug. 22, 2000

[54] FLUOROSILICONE PRIMER FREE OF VOLATILE ORGANIC COMPOUNDS

[75] Inventor: Edwin R. Evans, Clifton Park, N.Y.

[73] Assignee: General Electric Company, Pittsfield, Mass.

[21] Appl. No.: 09/104,692

[22] Filed: Jun. 25, 1998

[51] Int. Cl.$^7$ ...................................................... C08K 5/54
[52] U.S. Cl. ............... 524/261; 106/287.13; 106/287.16; 528/17; 528/18
[58] Field of Search .................. 106/287.13, 287.16; 524/261; 528/17, 18

[56] References Cited

U.S. PATENT DOCUMENTS

| | | |
|---|---|---|
| 4,923,496 | 5/1990 | Braglia . |
| 5,008,154 | 4/1991 | Meddaugh . |
| 5,213,617 | 5/1993 | Blizzard .............................. 106/287.13 |
| 5,238,708 | 8/1993 | Blizzard . |
| 5,326,844 | 7/1994 | Fujiki et al. . |
| 5,366,807 | 11/1994 | Fey . |
| 5,399,612 | 3/1995 | Calhoun . |
| 5,422,396 | 6/1995 | Daly et al. . |
| 5,466,532 | 11/1995 | Wengrovius et al. . |
| 5,531,814 | 7/1996 | Bahr et al. . |
| 5,612,400 | 3/1997 | Gross et al. . |
| 5,755,866 | 5/1998 | Baylyl et al. ....................... 106/287.13 |

FOREIGN PATENT DOCUMENTS

| | | |
|---|---|---|
| 0 500 115 A1 | 8/1992 | European Pat. Off. . |
| 06136343 | 5/1994 | Japan . |
| 09212362 | 5/1998 | Japan . |

OTHER PUBLICATIONS

Translation of JP 06136343 A, Ushio et al., Toray Dow Corning Co., Ltd.

*Primary Examiner*—Robert Dawson
*Assistant Examiner*—Jeffrey B. Robertson

[57] ABSTRACT

A solution comprising a composition and a volatile silicone solvent overcomes the environmental disadvantages associated with volatile organic compounds. The invention particularly provides for a primer composition for bonding silicone elastomers to metals that is free of volatile organic compounds comprises an epoxy alkoxy silane, a titanium ortho alcoholate or ortho ester, a silicon ortho alcoholate or ortho ester and a volatile silicone compound.

8 Claims, No Drawings

FLUOROSILICONE PRIMER FREE OF VOLATILE ORGANIC COMPOUNDS

FIELD OF THE INVENTION

The present invention relates to primer compositions to improve the adhesion of fluorosilicone elastomers to substrates.

BACKGROUND OF THE INVENTION

Many fuel and emission control systems for automobiles use flexible diaphragms to control fuel-air mixtures. Depending on the actual design these diaphragms, which are usually fabricated from an elastomeric material, are supported by a metal insert that serves either to position the diaphragm or which interacts with a sensor in response to movement of the diaphragm. Typically these metal parts are manufactured from galvanized steel but other metals such as stainless steel, aluminum and titanium have been used. Occasionally mineral reinforced polymers such as mineral filled nylon have been used as supporting inserts for elastomeric diaphragms in fuel control devices. The elastomeric material forming the diaphragm must bond to the supporting substrate, such as a metal insert, with a sufficiently strong bond that the mode of failure of the elastomeric diaphragm is cohesive rather than adhesive. This means that the primary failure mode of the device comprised of the metal insert and the elastomeric diaphragm is within the diaphragm (cohesive) rather than a failure of the diaphragm metal bond (adhesive).

There are generally two methods of constructing such composite devices. The first method involves incorporating an adhesion promoter into the elastomeric composition so that when the diaphragm is formed in situ in the presence of a supporting metal insert it will bond to the metal. This causes fusion between the elastomer and the mold because most of the molds are metal and the elastomer does not distinguish between the metal of the insert and the metal of the mold. Consequently when a formed in place molding process is used, the mold must be lined with Teflon® or Mylar® in order to prevent the elastomer from adhering to the metal of the mold.

An alternative approach is to use a primer on the metal insert. Thus when manufacturing a formed in place diaphragm, the metal insert is coated with a primer and the elastomer bonds to the primed metal and is released from the unprimed metal of the mold. Commercial primers to accomplish this are available but a significant drawback of these commercial formulations is that the solvents employed are usually mixtures of volatile aliphatic and aromatic hydrocarbons. The solvent in the primer composition must be volatile in order to evaporate quickly and form a primer layer on the metal substrate. Because the volatile solvents used in commercial formulations are organic and volatile there is a concern about emissions of volatile organic compounds (VOC). This has led to a desire for primer formulations that do not contain volatile organic compounds.

SUMMARY OF THE INVENTION

The present invention provides for a solution comprising a composition and a volatile silicone solvent. The present invention further provides for a method of rendering compositions containing volatile organic compounds more environmentally acceptable comprising preparing the composition and dispersing or dissolving the composition in a volatile silicone solvent. More particularly the present invention provides for a primer composition and a method of preparing same.

DETAILED DESCRIPTION OF THE INVENTION

I have discovered that volatile silicones may be used to replace volatile organic solvents in solutions where it is desired that the solvent evaporates. Thus, volatile silicones may be substituted for volatile organic compounds in a wide variety of commercially available materials where use involves application of the solution followed by evaporation of the solvent or carrier. This has a very significant environmental advantage because volatile silicones do not have the same deleterious effect on the atmosphere as volatile organic compounds. Thus any composition that currently utilizes active ingredients dispersed or dissolved in a volatile organic solvent may be rendered more environmentally acceptable by preparing the active ingredients and dispersing or dissolving those active ingredients in a volatile silicone solvent. I have further discovered that primer compositions for enhancing the bonding between elastomeric silicones such as fluorosilicone elastomers and metal such as steel, galvanized steel, stainless, steel, aluminum, titanium, copper, brass and the like may be formulated based on volatile silicones that do not present the pollution problem presented by volatile organic compounds. Such primer compositions comprise (components 1), 2) and 3)):

1) an epoxy substituted alkoxy silane;
2) a titanium organic ortho alcoholate or ortho ester;
3) a silicon organic ortho alcoholate or ortho ester; and
4) a volatile silicone solvent from the group consisting of hexamethylcyclotrisiloxane, 1,1,3,3,5,5,7,7-octamethylcyclotetrasiloxane, decamethylcyclopentasiloxane, 1,1,1,3,3,3-hexamethyldisiloxane and siloxanes having the formula $(R^1_3SiO_{1/2})_2(R^2_2SiO)_n$ where $R^1$ and $R^2$ are independently monovalent hydrocarbon radicals having from one to ten carbon atoms and n varies from 1 to about 10, preferably from 1 to about 5, more preferably from 1 to about 3 and most preferably from 1 to about 2.

In the primer compositions of the present invention the weight of component (a), the epoxy substituted alkoxy silane, varies from about 5.0 weight percent to about 15.0 weight percent, preferably from about 7.0 weight percent to about 13.0 weight percent, more preferably from about 8.0 weight percent to about 12.0 weight percent and most preferably from about 9.0 weight percent to bout 11.0 weight percent; component (d), a titanium ortho alcoholate or ortho ester, varies from about 5.0 weight percent to about 10.0 weight percent, preferably from about 6.0 weight percent to about 9.5 weight percent, more preferably from about 6.5 weight percent to about 8.5 weight percent and most preferably from about 7.0 weight percent to about 8.0 weight percent; the weight of component (c), a silicon organic ortho alcoholate or ortho ester, varies from about 5.0 weight percent to about 15.0 weight percent, preferably from about 7.0 weight percent to about 13.0 weight percent, more preferably from about 8.5 weight percent to about 11.5 weight percent and most preferably from about 9.0 weight percent to bout 11.0 weight percent; and the weight of component (b), the volatile silicone solvent, varies from about 60.0 weight percent to about 85.0 weight percent, preferably from about 65.0 weight percent to about 80.0 weight percent, more preferably from about 70.0 weight percent to about 78.0 weight percent and most preferably from about 70.0 weight percent to bout 75.0 weight percent.

In the compositions of the present invention the epoxy substituted alkoxy silane has the formula: $E(R^3O)_3Si$ where E is a monovalent organic radical having from four to forty carbon atoms and comprises an epoxide moiety:

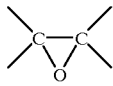

where the unsatisfied valences of the epoxide moiety are satisfied by a bond to one or more atoms in the monovalent organic radical or by hydrogen and $R^3$ is a monovalent organic radical having from one to ten carbon atoms. Preferably the epoxy substituted alkoxy silane is selected from the group consisting of gamma-glycidoxypropyltrimethoxysilane and epoxycyclohexylethyltrimethoxysilane.

The titanium ortho alcoholate or ortho ester has the formula $Ti(OR^4)_4$ where $R^4$ is a monovalent organic radical having from one to twenty carbon atoms subject to the limitation that $Ti(OR^4)_4$ will hydrolyze to produce $TiO_2$ and $R^4OH$ in moist air, that is air having a relative humidity greater than 30%.

The silicon ortho alcoholate or ortho ester has the formula $Si(OR^5)_4$ where $R^5$ is a monovalent organic radical having from one to twenty carbon atoms subject to the limitation that $Si(OR^5)_4$ will hydrolyze to produce $SiO_2$ and $R^5OH$ in moist air, that is air having a relative humidity greater than 30%.

One function of the primer composition is to form a deposit or layer of the reaction product of the components of the primer less the volatile silicone solvent on the substrate treated with the primer thereby forming a continuous or discontinuous layer creating a laminate comprised of the reaction products of the primer and the substrate.

Experimental 1,1,1,3,3,3-hexamethyldisiloxane (HMDS) was dried either by azeotropic distillation or by contact with a drying grade anhydrous silica gel. Dried HMDS was placed in a dried glass flask under a blanket of dried nitrogen and the active ingredients of the primer composition were added in the following order: 1) gamma-glycidoxytrimethoxysilane, 2) tetrabutyltitanate, and 3) tetraethylorthosilicate. When the only volatile non-reactive component is the silicone solvent, the weight percent non-volatile fraction of the primer composition varies over the range from about 20.0 to about 30.0 weight percent, preferably from about 23.0 to about 30.0 weight percent, more preferably from about 24.0 to about 29.0 weight percent and most preferably from about 25.0 to about 29.0 weight percent. Usually the non-volatile fraction of the primer composition will correspond to weight percent solids. Using the method of preparation disclosed, a primer having the following composition was prepared: 10.26 weight percent gamma-glycidoxytrimethoxysilane, 7.25 weight percent tetrabutyltitanate, 10.03 weight percent tetraethylorthosilicate and 72.46 weight percent 1,1,1,3,3,3-hexamethyldisiloxane.

The primer thus prepared was used to provide a coating bath for galvanized steel metal inserts which were dip coated and allowed to air dry. The coated inserts were bonded to a 65 durometer fluorosilicone elastomer evaluated for lap shear properties. The lap shear properties were measured by ASTM test D-3164-92a. The strength of the bond was maximized at a drying time of the primer coating of 20 minutes as shown in Table 1.

TABLE 1

| Lap Shear as a Function of Primer Drying Time | |
|---|---|
| Lap Shear, lbs. pull | Drying Time, minutes |
| Present Invention | |
| 145 | 10 |
| 245 | 20 |
| 218 | 40 |
| 176 | 90 |
| A4040 Control: | |
| 200 | 20 |

The A4040™ control, commercially available from Dow Corning, is a hydrocarbon solvent (volatile organic compound) based primer composition that contains 15.0 parts by weight trifluoropropyltrimethoxysilane, 2.0 parts by weight tetrapropylorthosilicate, 2.0 parts by weight tetra(2-methoxyethoxy)silane, 5.0 parts by weight vinyltrimethoxysilane, 2.0 parts by weight tetrabutyltitanante, 6.0 parts by weight xylene and 75 parts by weight of a light paraffinic petroleum naphtha.

The lap shear test is performed in the following manner. Metal test coupons (as above), 6"×1"×1/16", were first thoroughly cleaned with lint free laboratory cleaning tissues (Kimwipes®) dampened with isopropyl alcohol. A one square inch section at one end of the coupon is coated with the primer in such a fashion as to leave a dried coating of 1 micron thickness. The coupons are allowed to air dry at 23° C. and 50% relative humidity. A sheet of fluorosilicone elastomer 0.03" thick is cut into 1"×1" squares and placed between two of the test coupons having with primed ends with the elastomer positioned so that the elastomer is in contact with a primed metal surface on both coupons. This metal elastomer metal sandwich was placed in a compression jig under approximately 10,000 psi and the elastomer was compressed from 0.03" to 0.02" and while under compression was placed in a 200° C. air circulating oven for a period of one hour and allowed to cool to room temperature for at least two hours. Lap shear testing as described in ASTM test D-3164-92a was performed on a Monsanto T-10™ Tensiometer.

Having defined the invention that which is claimed is:

1. A primer solution comprising:
    a) a primer composition, comprising:
        1) an epoxy substituted alkoxy silane;
        2) a titanium compound selected from the croup consisting of titanium ortho alcoholates and titanium ortho esters; and
        3) a silicon compound selected from the group consisting of silicon ortho alcoholates and silicon ortho esters; and
    b) a volatile silicone solvent.

2. The composition of claim 1 wherein the volatile silicone is selected from the group consisting of hexamethylcyclotrisiloxane, 1,1,3,3,5,5,7,7-octamethylcyclotetrasiloxane, decamethylcyclopentasiloxane, 1,1,1,3,3,3-hexamethyldisiloxane and siloxanes having the formula $(R^1_3SiO_{1/2})_2(R^2_2SiO)_n$ where $R^1$ and $R^2$ are independently monovalent hydrocarbon radicals having from one to ten carbon atoms and n varies from 1 to about 10.

3. The composition of claim 1 wherein the volatile silicone is hexamethylcyclotrisiloxane.

4. The composition of claim 1 wherein the volatile silicone is 1,1,3,3,5,5,7,7-octamethylcyclotetrasiloxane.

5. The composition of claim 1 wherein the volatile silicone is decamethylcyclopentasiloxane.

6. The composition of claim 1 wherein the volatile silicone is 1,1,1,3,3,3-hexamethyldisiloxane.

7. The composition of claim 1 wherein the volatile silicone is a siloxane having the formula $(R^1{}_3SiO_{1/2})_2 (R^2{}_2SiO)_n$, where $R^1$ and $R^2$ are independently monovalent hydrocarbon radicals having from one to ten carbon atoms and n varies from 1 to about 10.

8. A primer solution consisting essentially of:
  a) a primer composition, comprising:
    1) an epoxy substituted alkoxy silane;
    2) a titanium compound selected from the group consisting of titanium ortho alcoholates and titanium ortho esters; and
    3) a silicon compound selected from the group consisting of silicon ortho alcoholates and silicon ortho esters; and
  b) a volatile silicone solvent.

* * * * *